United States Patent [19]

Osby et al.

[11] Patent Number: 5,412,064

[45] Date of Patent: May 2, 1995

[54] PROCESS FOR PREPARING POLYCARBONATE FROM A BISPHENOXY FLUORENE

[75] Inventors: John O. Osby, Lake Jackson; John K. Sekinger, Lumberton, both of Tex.

[73] Assignee: The Dow Chemical Company, Midland, Mich.

[21] Appl. No.: 180,268

[22] Filed: Jan. 12, 1994

[51] Int. Cl.$^6$ ............................................. C08G 63/02
[52] U.S. Cl. ................................. 528/298; 528/196; 528/198
[58] Field of Search ........................ 528/196, 198, 298

[56] References Cited

U.S. PATENT DOCUMENTS

| | | | |
|---|---|---|---|
| 2,754,285 | 7/1956 | Petropoulos | 528/97 |
| 3,110,698 | 11/1963 | Laakso et al. | 528/182 |
| 3,128,264 | 4/1964 | Laakso et al. | 528/201 |
| 3,213,061 | 10/1965 | Caldwell et al. | 528/295 |
| 3,216,970 | 11/1965 | Conix | 528/176 |
| 3,974,126 | 8/1976 | Narita et al. | 528/196 |
| 4,100,139 | 7/1978 | Bagget et al. | 528/196 |
| 5,288,836 | 2/1994 | Mychajlowskij | 528/198 |

OTHER PUBLICATIONS

Japanese Patent Application 62-12282.
Derwent Abstract 89-019711/03.
Derwent Abstract 88-216711/31.
Derwent Abstract 90-121417/16.
Derwent Abstract 91-033895/05.
Derwent Abstract 60437C/34 (U.S. Pat. No. 4,216,305).
Derwent Abstract 74111 D/41 (U.S. Pat. No. 4,310,652).
Derwent Abstract 84-284591/46.
Derwent Abstract 88-123711/18.
Derwent Abstract 87-318663/45.
Derwent Abstract 90-011653/02.
Derwent Abstract 90-011654/02.
Derwent Abstract 69,453P (U.S. Pat. No. 3,274,214).
Derwent Abstract 70,066P (U.S. Pat. No. 3,275,601).
Derwent Abstract 88-300966/43 (U.S. Pat. No. 4,950,731).
Chemical Abstract 13486s.
Chemical Abstract 140593k.
Chemical Abstract 96: 52932g.
The Encyclopedia of Chemical Technology, "Catalysis Phase-Transfer", Kirk-Othmer, Third Edition, vol. 5,, John Wiley and Sons, New York 1979, pp. 62–29.
Korshak, V. V. et al., "Influence of the Steric Factor of the Visocosimetric Properties and Polydispersion of Polyarlylates", translated from Doklady Akademii Nauk SSSR, vol. 160, No. 1, pp. 119–122, Jan., 1965.
Kambour, R. P. et al., General Electric Corporate Research and Development, "Bisphenol Fluorenone Carbonate-Silicone Block Polymers Improved Synthesis and Further Studies of Mechanical and Flammability Properties", Final Report, Contract No., N0019-7-6-C-0096 for the Naval Air Systems Command, Department of Navy, Apr. 1977.
Kambour, R. P. et al., General Electric Corporate Research and Development "Synthesis and Properties of Bisphenol Fluorenone Polycarbonate and BPF Carbonate-Dimethylsiloxane Block Polymers", Final Report, Contract No., N0019-73-C-0152 for the Naval Air Systems Command, Department of Navy, Jan. 1974.
Morgan, P. W., Journal of Polymer Science, Part A, "Linear Condensation Polymers from Phenolphtalein and Related Compounds", vol. 2, pp. 437–459 (1964).
Morgan, P. W., Macromolecules, vol. 3, No. 5, Sep.-Oct., "Aromatic Polyesters with Large Cross-Planar Substituents", pp. 536–544 (1970).

Primary Examiner—John Kight, III
Assistant Examiner—Terressa M. Mosley

[57] ABSTRACT

A process for preparing polycarbonate from a bisphenoxy fluorene in which, to obtain a reaction mixture in which the bisphenoxy fluorene is dissolved, the bisphenoxy fluorene is reacted with a carbonate precursor at an elevated temperature, for example about 50° C. or more.

50 Claims, No Drawings

PROCESS FOR PREPARING POLYCARBONATE FROM A BISPHENOXY FLUORENE

FIELD OF THE INVENTION

This invention relates to a process for preparing polycarbonate from a bisphenoxy fluorene.

BACKGROUND OF THE INVENTION

Bisphenoxy fluorenes are finding increasing favor as monomers from which to prepare polycarbonate because the resulting polycarbonate typically exhibits a desirably high resistance to thermal deformation and degradation. A bisphenoxy fluorene can be used alone to make a homopolycarbonate, or can be reacted together with one or more other dihydroxy compounds to make a copolycarbonate. It has been found, however, that when polycarbonate is being produced even in part from a bisphenoxy fluorene, various refinements of the typical interfacial process are desirable if production on a commercially meaningful scale is to occur.

When polycarbonate is prepared from Bisphenol-A, which is the monomer most widely used in commercial production, the reaction between Bisphenol-A and a carbonate precursor typically occurs at a temperature in the range of about 25°–40° C., and complete dissolution of Bisphenol-A in the aqueous phase of the reaction mixture may be easily obtained at that temperature. However, a bisphenoxy fluorene is not soluble to any significant degree in aqueous base at a temperature in the range which is ordinarily associated with the production of Bisphenol-A polycarbonate. At a temperature of less than 50° C., for example, a mixture of aqueous base and a bisphenoxy fluorene at a concentration of above 0.05M has the consistency of a viscous paste. It is not practical, from the standpoint of material flow and handling, to utilize a reaction mixture for production of polycarbonate from a bisphenoxy fluorene on a plant scale if the bisphenoxy fluorene is not at least substantially completely dissolved in the aqueous phase thereof.

In Report AD-777 731 to the Naval Air Systems Command (January 1974), Kambour and Niznik describe the interfacial formation of polycarbonate from a bisphenoxy fluorene in which it was found that the monosodium salt of a bisphenoxy fluorene is insoluble in water and organic solvents. Morgan, U.S. Pat. No. 3,546,165 reports a similar problem with low solubility of a bisphenoxy fluorene in water, and, as a consequence, discloses a process for preparing polycarbonate from a bisphenoxy fluorene in which an accelerator (i.e. a phase transfer catalyst) and a 100 percent excess of base are used. In Japanese Kokai Publication 62-12,282 (1987), a process for preparing polycarbonate is set forth in which, although a bisphenoxy fluorene is reacted with phosgene dimer at a temperature of 0° C.–90° C., this reaction is also carried out in the presence of a surfactant (i.e. a phase transfer catalyst). Since it is usually preferred to prepare polycarbonate from a bisphenoxy fluorene by means of an interfacial process in which the bisphenoxy fluorene is soluble in the aqueous phase of the reaction mixture, a desirable improvement thereto would be a process in which not only is the bisphenoxy fluorene soluble but a phase transfer catalyst is not needed.

SUMMARY OF THE INVENTION

In one aspect, this invention involves a process for preparing a polycarbonate in which a bisphenoxy fluorene is contacted with a carbonate precursor at a temperature of about 50° C. or more in a reaction mixture which consists essentially of aqueous base and an organic solvent, that is in a reaction mixture which contains nothing other than the recited components which would materially affect the fundamental nature of the reaction which occurs in the process.

In another aspect, this invention involves process for preparing a polycarbonate in which a bisphenoxy fluorene is contacted with a carbonate precursor at a temperature of about 50° C. or more in a reaction mixture containing aqueous base and an organic solvent in the absence of a phase transfer catalyst.

In a further aspect, this invention involves, a process for preparing a polycarbonate in which a bisphenoxy fluorene is contacted with a carbonate precursor in a reaction mixture which consists essentially of aqueous base and an organic solvent at a temperature sufficient to dissolve the bisphenoxy fluorene, to produce a polycarbonate.

In a still further aspect, this invention involves, a process for preparing a polycarbonate in which a bisphenoxy fluorene is contacted with a carbonate precursor in a reaction mixture comprising aqueous base and an organic solvent in the absence of a phase transfer catalyst, at a temperature sufficient to dissolve the bisphenoxy fluorene, to produce a polycarbonate.

In yet another aspect, this invention involves a process for preparing polycarbonate in which (a) a stream of a carbonate precursor is fed into a reactor at a first rate, (b) a stream of a monomer mix of bisphenoxy fluorene in aqueous base is fed into said reactor at a second rate, where said second rate is less than said first rate, and (c) said stream of carbonate precursor is combined with said stream of monomer mix in the presence of an organic solvent to form a reaction mixture in which the bisphenoxy fluorene is reacted with the carbonate precursor at a temperature of about 50° C. or more to produce a polycarbonate, By the process of this invention, a polycarbonate is prepared which is useful by itself or in compositions for the production, for example, of membranes, films, fibers, extruded sheets, multi-layer laminates and molded or shaped articles of virtually every variety, particularly for use in high temperature environments such as the automotive or electronics industries. When softened by the application of heat, the polycarbonate prepared by the process of this invention is suitable for fabrication, and may be spun, drawn, formed or molded using conventional techniques such as rolling, vacuum- or thermo-forming, or compression, injection or blow molding, alone or in combination. The polycarbonate produced by the process of this invention may also be compounded with one or more other organic or inorganic substances, including other polymers, by dry blending in a tumbler or shaker followed, if desired, by shearing stress at a temperature sufficient to cause heat plastification thereof, for example in an extruder with or without a vacuum.

DETAILED DESCRIPTION OF THE INVENTION

In general, polycarbonate may be prepared from an aromatic dihydroxy compound such as a bisphenoxy fluorene, alone or in a copolymer with other dihydroxy compounds, and a carbonate precursor such as a carbonic acid derivative, a haloformate or a carbonate ester. In a preferred embodiment of this invention, the carbonate precursor excludes the phosgene dimer trichloromethylchloroformate ($C_2O_2Cl_4$). These components are usually reacted by means of the phase boundary process in which the dihydroxy compound is at least partially dissolved and partially deprotonated by aqueous base, and the carbonate precursor is dissolved by an organic solvent.

A solution of aqueous base is formed from water and a base which may be selected from those including the alkali metal and alkaline earth metal phosphates, bicarbonates, oxides and hydroxides. A preferred base for preparing such a solution is a caustic soda such as NaOH. The dihydroxy compound and the solution of aqueous base make up the aqueous phase of the reaction mixture, and in the practice of this invention, the dihydroxy compound (the bisphenoxy fluorene) is substantially completely dissolved, if not completely dissolved, in the aqueous base. Base imparts increased reactivity to the dihydroxy compound by adjusting the pH of the aqueous phase to a level at which the dihydroxy compound is at least partially converted to dimetal salt form. The pH of the aqueous phase is, as a result, adjusted to a level greater than 7.0, often to a pH in the range of about 8.5 to 13.5.

The components are typically reacted by means of a mixture which is prepared initially from the dihydroxy compound, water and base, and, optionally, an organic solvent selected from among those which are immiscible with water and are non-reactive, but in which the carbonate precursor and polycarbonate product are soluble. Representative solvents include chlorinated hydrocarbons such as methylene chloride, 1,2-dichloroethane, tetrachloroethane, chlorobenzene, and chloroform, to which tetrahydrofuran, dioxane, nitrobenzene, dimethyl sulfoxide, xylene, cresol or anisole may be added, if desired. An organic solvent may be present in admixture with the aqueous phase of the reaction mixture, or may instead form a solution with the carbonate precursor, or may be used both ways.

A carbonate precursor is contacted with the dihydroxy compound in an agitated reaction mixture also containing water, base and an organic solvent, and, for such purpose, the carbonate precursor can be bubbled into the reaction mixture in the form of a gas, or can be dissolved and introduced in liquid form. Carbonate precursor is seldom used in an amount less than about 1.2 moles per mole of dihydroxy compound, and is typically used in an amount greater than about 1.35 moles, and preferably in the range of about 1.5 to 2.0 moles per mole of dihydroxy compound. The mixture is agitated in a manner which is sufficient to disperse or suspend droplets of the organic solvent containing the carbonate precursor in the aqueous phase. Reaction between the dihydroxy compound and the carbonate precursor caused by such agitation yields the bis(carbonate precursor) ester of the dihydroxy compound. For example, if the carbonate precursor is a carbonyl halide such as phosgene, the products of this initial phase of the process are monomers or oligomers which contain either a chloroformate group or a phenolate ion at each terminus. These intermediate mono- and oligocarbonates dissolve in the organic phase as they form, and they can then be condensed to a higher molecular weight polycarbonate.

After reaction between the dihydroxy compound and carbonate precursor, to facilitate coupling of the intermediate mono- and oligocarbonates, a polycarbonate condensation coupling catalyst is typically added to the reaction mixture. The following are representative of such a catalyst: a tertiary amine such as triethyl amine or a pyridine; a cyclic aza compound such as 2,2,6,6-tetramethyl piperidine or 1,2-dimethylimidazole; an iminoether or iminocarboxylate compound such as 1-aza-2-methoxy-1-cycloheptene or t-butylcyclohexyliminoacetate; or a phosphonium, sulfonium, arsonium or quaternary ammonium compound. The amount of coupling catalyst used may be in the range of about 1 weight part per million ("ppm") to about 2,000 ppm, based on the amount of all organic solvent present in the reaction mixture, preferably about 50 ppm to about 500 ppm, and more preferably about 75 ppm to about 300 ppm.

Activated pyridines are particularly useful as oligocarbonate coupling catalysts in the preparation of polycarbonate by the process of this invention, and these include either a pyridine or pyridine salt whose catalytic activity is increased by a substituent at the 2 or 4 ring position. Suitable 4-aminopyridines for use according to the present invention are 4-dimethylaminopyridine, 4-pyrrolidinopyridine and poly(N,N-dialkylaminopyridine). Examples of suitable 2-substituted pyridines are methylpyridine, ethylpyridine, isopropylpyridine and polyvinyl pyridine. Activated pyridines having additional alkyl groups may also be used, such as those represented as follows:

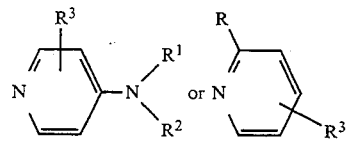

where R is a monovalent $C_1$–$C_{12}$ alkyl or cycloalkyl radical, or a polymer chain formed from at least 60 percent, and preferably at least 80 percent, by weight carbon atoms (such as a polyolefin or polystyrene chain), such that the formula weight of the catalyst is less than 50,000; $R^1$ and $R^2$ are each independently a monovalent $C_1$–$C_{12}$ alkyl or cycloalkyl radical, or one of $R^1$ or $R^2$ may be a polymer chain as described above with respect to R, or $R^1$ and $R^2$ may be monovalent $C_1$–$C_8$ alkyl radicals which are joined and, together with N, form a cyclic structure; and $R^3$ is independently hydrogen or a monovalent $C_1$–$C_{12}$ alkyl radical. A preferred activated pyridine is 4-dimethylaminopyridine.

The molecular weight of a polycarbonate can be controlled by addition to the reaction mixture of a chain terminator which may be selected from monofunctional substances such as phenols, alcohols, amines, imides, carbonic acid chlorides, sulfonic acid chlorides, or phenylchlorocarbonates. Addition of a chain terminator to the reaction mixture may occur before or after a dihydroxy compound is contacted with a carbonate precursor, and typically occurs before injection of a coupling catalyst.

As described above, base is present in the aqueous phase of the reaction mixture containing the dihydroxy compound which is contacted with a carbonate precursor to form an oligocarbonate. All the base needed for polycarbonate formation may be supplied in the beginning in the aqueous phase before the reaction commences. Or, in addition to the amount of base initially present in the aqueous phase, base may be fed in continuously from the time the reaction starts, or base may be supplied at discrete intervals or steps in the progress of the reaction. For example, additional base may be supplied before a chain terminating agent is fed to the reaction mixture, and/or additional base may be supplied prior to or simultaneously with injection of a coupling catalyst.

Upon completion of polymerization, the organic and aqueous phases of the reaction mixture are separated to allow purification and recovery of the polycarbonate product from the organic phase. The organic phase is washed as needed in a centrifuge with dilute base, water and/or dilute acid until free of unreacted monomer, residual process chemicals and/or other electrolytes. Recovery of the polycarbonate product from the organic phase can be effected by spray drying, steam devolatilization, direct devolatilization in a vented extruder, or precipitation by use of an anti-solvent such as toluene, cyclohexane, heptane, methanol, hexanol, or methyl ethyl ketone.

In the preparation of a polycarbonate from a bisphenoxy fluorene by the process of this invention, steps of particular importance include elevation of the temperature, and the ratio in the polycarbonate-forming reaction mixture of moles of base to moles of bisphenoxy fluorene and other dihydroxy compounds, if any.

Heating a mixture of aqueous base and a bisphenoxy fluorene significantly improves the solubility of the bisphenoxy fluorene therein, and allows such mixture to be conveniently used to prepare polycarbonate, even on a commercial scale. A temperature of at least about 50° C., for example, a temperature which is about 50° C. or more, preferably about 60° C. or more, and more preferably about 65° C. or more, and yet which is about 90° C. or less, preferably about 80° C. or less, and more preferably about 75° C. or less, is typically sufficient to attain substantially complete, if not complete, dissolution of a bisphenoxy fluorene in aqueous base for use as the aqueous phase of a polycarbonate-forming reaction mixture. Heating a mixture of aqueous base and a bisphenoxy fluorene to a temperature as described in the preceding sentence makes it possible also to conduct the reaction of the bisphenoxy fluorene with a carbonate precursor at such a temperature.

A temperature resulting in dissolution of a bisphenoxy fluorene in the aqueous phase of a polycarbonate-forming reaction mixture may be attained by heating a mixture of aqueous base and such monomer before the monomer is contacted with a carbonate precursor, heating the flow lines from the monomer make-up tank from which the monomer solution is fed to the reactor, heating the reaction vessel in which the bisphenoxy fluorene monomer solution and carbonate precursor are contacted, or by two or more of such methods in combination.

Solubility of a bisphenoxy fluorene in the aqueous phase of a polycarbonate-forming reaction mixture is enhanced as well if the ratio of moles of base to moles of all dihydroxy compounds present therein (including the bisphenoxy fluorene) is at least about 2.0, for example, a ratio which is about 2.0 or more, preferably about 2.1 or more, and more preferably about 2.25 or more, and yet which is about 3.85 or less, preferably about 3.0 or less, and more preferably about 2.50 or less. When base in an amount as described above is used, the pH of the aqueous phase of the reaction mixture will be in the range of about 12.0 to less than 14.0, preferably in the range of about 12.0 to about 13.5.

In a reaction mixture in which a bisphenoxy fluorene is heated to, and/or reacts at, a temperature as set forth above, and in which, optionally, the ratio of base to dihydroxy compound is at a level as set forth above, a bisphenoxy fluorene may also be present in the aqueous phase at a desirably high concentration. For example, the concentration of a bisphenoxy fluorene in the aqueous volume consisting of the bisphenoxy fluorene and all water, whether added alone or in the form of aqueous base, may be at least about 0.05M, and may be a concentration of about 0.1M or more, preferably about 0.3M or more, and more preferably about 0.45M or more, and yet be a concentration of about 0.75M or less. A higher concentration of bisphenoxy fluorene in the aqueous phase of the reaction mixture is clearly advantageous from the standpoint of obtaining a higher production capacity for a given plant size.

Reaction of a bisphenoxy fluorene and carbonate precursor under the conditions described above may be run in the absence of a phase transfer catalyst. Typical phase transfer catalysts are quaternary phosphonium or ammonium salts, such as tetraethylammonium chloride or tributylbenzylammonium chloride, crown ethers and cryptates. These are added to the reaction mixture, or to the aqueous phase thereof, before reaction of a bisphenoxy fluorene with a carbonate precursor to enhance solubility of the bisphenoxy fluorene, and to reduce or prevent precipitation of the bisphenoxy fluorene, once it is dissolved, before the reaction occurs. The operation of a phase transfer catalyst is described in greater detail in Kirk-Othmer, *Encyclopedia of Chemical Technology*, John Wiley & Sons (1979), volume 5, pages 62–69, which pages are incorporated herein. Use of a phase transfer catalyst to effect or increase solubility of a bisphenoxy fluorene in polycarbonate production on a plant scale would be inefficient and expensive. After use, the catalyst would either have to be recovered for recycle or disposed of in an environmentally sound manner.

If the temperature at which the bisphenoxy fluorene reacts with a carbonate precursor is higher than the boiling point of the organic solvent present in the reaction mixture, it may be desirable to run the reaction under pressure. For example, a pressure of greater than one atmosphere, preferably a pressure in the range of greater than one atmosphere to about 10 atmospheres, and more preferably a pressure in the range of about 1.3 to about 10 atmospheres, may be desirable to prevent volatilization of solvent to the extent that progress of the reaction is impeded.

A particularly helpful approach in the process of this invention is to begin the addition of carbonate precursor to the reaction vessel at about the maximum rate (measured in moles/period of time) desired for it during the reaction before beginning addition of a bisphenoxy fluorene. The carbonate precursor is thus added at a first rate, and may be hydrolyzed with base during the interim period before addition of a bisphenoxy fluorene (dissolved in aqueous base) is begun at a second rate, the second rate being lower than the first rate. The second rate may, for example, be about 60 percent or less of the first rate, preferably about 30 percent or less, and more preferably about 10 percent or less. Beginning the feed of the bisphenoxy fluorene at a rate lower than that for the carbonate precursor reduces the likelihood that any significant amount of bisphenoxy fluorene monomer will fail to react, and that such unreacted monomer will solidify as its temperature later drops and obstruct the reaction vessel in later stages of the process. The rate of bisphenoxy fluorene feed may then be increased until it is equal to the first rate, and this may be most advantageously done in one, two or more increments, which increments may but need not be equal. For each increment of increase in the rate of addition of bisphenoxy fluorene (the second rate), a corresponding and equal decrease in the rate of flow of base may be simultaneously made until the flow of base is stopped. The various increments of increase in the rate of addition of a bisphenoxy fluorene (and corresponding decreases in the rate of flow of base) may, for example, be less than about 80 percent, preferably less than about 60 percent and more preferably less than about 40 percent, or may be, for example, about 10 percent, preferably about 15 percent and more preferably about 20 percent, of the second rate.

Examples of bisphenoxy fluorenes suitable for use in the process of this invention for preparing a polycarbonate or copolycarbonate may be represented generally by the formula:

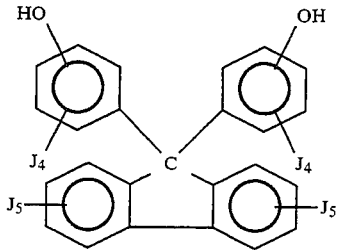

wherein each J is independently hydrogen, a halogen (such as fluorine, chlorine and/or bromine), or a $C_1$–$C_{12}$, preferably $C_1$–$C_6$, linear or cyclic alkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy. The most preferred bisphenoxy fluorene is 9,9-bis(4-hydroxyphenyl) fluorene. Methods of preparing a bisphenoxy fluorene are known, as set forth in U.S. Pat. No. 3,546,165.

Instead of a bisphenoxy fluorene homopolycarbonate, a copolycarbonate may be prepared by employing two or more of the above described bisphenoxy fluorenes, or by employing, in addition to one or more bisphenoxy fluorenes, one or more dihydroxy compounds which do not possess such a fluorene double-ring structure. These copolycarbonates may be segmented, block, random or alternating copolymers. Examples of other dihydroxy compounds suitable for use in the process of this invention together with a bisphenoxy fluorene for preparing a copolycarbonate include variously bridged, substituted or unsubstituted dihydric phenols represented by the formula

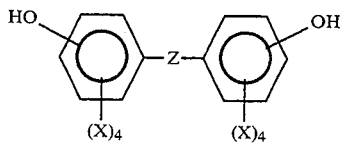

wherein:
(I) Z is (A) a divalent radical, of which all or different portions can be (i) linear, branched, cyclic or bicyclic, (ii) aliphatic or aromatic, and (iii) saturated or unsaturated, said divalent radical being composed of 1–35 carbon atoms together with up to five atoms selected from the group consisting of oxygen, nitrogen, sulfur, phosphorous and halogen (such as fluorine, chlorine and/or bromine) atoms; or is (B) S, $S_2$, SO, $SO_2$, O or CO; or is (C) a single bond; and
(II) each X is independently hydrogen, a halogen (such as fluorine, chlorine and/or bromine), or a $C_1$–$C_{12}$, preferably $C_1$–$C_6$, linear or cyclic alkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy.

For example, the bridging radical represented by Z in the above formula can be a carbon atom to which is bonded one or more groups such as $CH_3$, $C_2H_5$, $C_3H_7$, n-$C_3H_7$, i-$C_3H_7$, cyclohexyl, bicyclo[2.2.1]heptyl, benzyl, $CF_2$, $CF_3$ $CCl_3$, $CF_2Cl$, CN, $(CH_2)_2COOCH_3$, or $PO(OCH_3)_2$.

Dihydric phenols useful in preparing such a copolycarbonate include, but are not limited to:

bis(4-hydroxyphenyl)-sulphone,
bis(3-hydroxyphenyl)-sulphone,
bis(2-hydroxyphenyl)-sulphone,
bis(4-hydroxyphenyl)methane,
1,1-bis(4-hydroxyphenyl)-propane,
1,1-bis(4-hydroxyphenyl)-butane,
1,1-bis(4-hydroxyphenyl)-heptane,
1,1-bis(4-hydroxyphenyl)-cyclopentane,
1,1-bis(4-hydroxyphenyl)-cyclohexane;

and the like. Dihydric phenols having a single or joined aryl rings may also be employed, in addition to those named above, in copolymer formation. Such compounds include, for example, resorcinol, dihydroxy naphthalene and dihydroxy anthracene, or derivatives thereof substituted with one or more halogen atoms and/or $C_1$–$C_{12}$ alkyl, cycloalkyl or alkoxy groups. A preferred dihydric phenol for copolycarbonate formation with a bisphenoxy fluorene is 2,2-bis(4-hydroxyphenyl) propane ("Bisphenol-A").

When a copolycarbonate is prepared from a bisphenoxy fluorene and another dihydroxy compound which does not possess the fluorene double-ring structure, the portion of the total dihydroxy compound content in the copolymer represented by the bisphenoxy fluorene may be an amount of about 1 to about 99 weight percent, for example, an amount of at least about 40, preferably at least about 60, more preferably at least about 75, and most preferably at least about 90 weight percent, with the balance being made up by the non-fluorene dihydroxy compound.

When a dicarboxylic acid (or ester-forming derivative thereof) or a hydroxycarboxylic acid is used in the reaction mixture, or to form an oligomeric prepolymer, instead of or in addition to one of the above described dihydric phenols, a type of copolycarbonate which is a poly(ester/carbonate) is obtained. Poly(ester/carbonate)s are discussed in greater detail in Swart, U.S. Pat. No. 4,105,533, which is incorporated herein. In a preferred embodiment, however, the polycarbonate prepared by the process of this invention excludes a poly(ester/carbonate).

A branched rather than linear polycarbonate molecule can be obtained by adding to the reaction mixture a tri- or polyfunctional monomer such as a tri-or tetrafunctional phenol or carboxylic acid (or ester-forming derivative, such as an acyl halide or anhydride), a bisphenol containing carboxylic acid side groups, or a nitrogen-containing compound such as cyanuric chloride, or compounds containing a mixture of such groups. Preferred branching agents are trimellitic acid, pyromellitic dianhydride or 1,1,1-tris(4-hydroxyphenyl)ethane.

Using a process such as is generally described herein, a polycarbonate or copolycarbonate product can be obtained having (i) a weight average molecular weight, as determined by light scattering or gel permeation chromatography, of about 5,000 to about 250,000, preferably about 15,000 to about 100,000, and more preferably about 18,000 to about 45,000;(ii) a phenolic (-OH) end group content (as determined by the titanium chloride colorimetric method described in Horbach et al, *Encyl. Ind. Chem. Anal.*, Vol. 17, pp. 329-352, Krieger, 1973) of less than about 500 ppm, preferably less than about 300 ppm, and more preferably less than about 150 ppm; and (iii) a polydispersity (weight average molecular weight divided by number average molecular weight) of less than about 3.0, preferably less than about 2.8, more preferably less than about 2.6 and most preferably less than about 2.3. The yield of a process such as is generally described herein, calculated as the weight of the polycarbonate product divided by the sum of the weights of both the dihydroxy compound and carbonate precursor reactants, is typically at least about 75 percent, preferably at least about 85 percent, more preferably at least about 90 percent, and most preferably at least about 95 percent.

The process of the present invention may be conducted in a single reaction vessel, or may be conducted independently in a series of individual reaction vessels wherein at least a portion of the reaction mixture prepared in a first reaction vessel in a first step is transferred to a second reaction vessel wherein another step is conducted, and so on throughout the process. The contemplated individual reaction vessels may additionally be continuous or batch reactors. Finally, the process may be conducted in a continuous reaction system, such as a tubular reactor, wherein the reaction system contains multiple reaction zones.

To illustrate the practice of this invention, examples of certain preferred embodiments are set forth below, but it is not intended that these examples should in any manner restrict the scope of this invention as defined by the appended claims.

Example 1

To a 100 mL glass pressure reactor having a stoppered sample port and an injector port are added 9,9-bis(4-hydroxyphenyl) fluorene (3.00 g, 8.56 mmole), p-tert-butylphenol (0.39 g, 0.26 mmole), water (25.5 mL) and NaOH (50 percent, 1.71 g, 21.41 mmole). The reactor is stoppered, the mixture is stirred magnetically and heated in a water bath to 70° C. to dissolve the monomer, giving a 0.3M solution. To this stirred solution is added a solution of phosgene in methylene chloride (18.64 g of 7.0 percent solution, 13.09 mmole phosgene). The mixture is shaken for 30 seconds, then 50 percent NaOH is injected (1.58 g, 19.76 mmole) followed by methylene chloride (12.0 g) and 1 percent 4-dimethylamino pyridine in water (0.29 g). The mixture is shaken again for 2 minutes, and the phases are then allowed to separate. The aqueous phase is removed and discarded, and the organic phase is washed with 0.1N HCl and water. Methylene chloride is evaporated to give a film with a weight average molecular weight of 32,766 and polydispersity (weight average molecular weight divided by number average molecular weight) of 2.47.

Example 2

To a 100 mL high pressure reactor with plug are added Bisphenol-A (0.913 g, 4.0 mmole), 9,9-bis(4-hydroxyphenyl) fluorene (2.102 g, 6.0 mmole), p-tert-butyl-phenol (0.045 g, 0.30 mmole), 50 percent NaOH (2.0 g, 25.0 mmole) and water (16.14 g). The reactor plug is loosely screwed in, and a needle connected to a nitrogen source is then inserted through the injector port septum. Nitrogen gas is blown through the air space of the reactor for 10 minutes, then the plug is tightened down. The sealed reactor is placed in a water bath (69°-71° C.), and a magnetic stirrer is started. Within 15 minutes the monomer has dissolved. To this stirred mixture is added phosgene solution in methylene chloride (20.08 g of 6.65 percent solution, 13 mmole) by 25 mL gastight syringe. The syringe is removed and the reaction mixture shaken for 30 seconds. A second shot of 50 percent NaOH (2.0 g, 25 mmole) is added by syringe through the septum. The mixture is shaken 1 minute, then further methylene chloride (11.17 g) is added by syringe, followed by 4-dimethylamino pyridine (0.6 mL of a 1 percent aqueous solution). This mixture is shaken 1 minute, then the reactor swirled in an ice bath. The reactor is opened, and the aqueous phase pipetted off. The organic phase is washed once with 1N HCl and twice with water, and it is then evaporated on a petri dish to give a 9,9-bis(4-hydroxyphenyl) fluorene/Bisphenol-A copolycarbonate film.

By contrast, it is found that when Example XXX of U.S. Pat. No. 3,546,165 is run in the absence of tetraethylammonium chloride monohydrate, the 9,9-bis(4-hydroxyphenyl) fluorene precipitates when the monomer mix is cooled, even when the 9,9-bis(4-hydroxyphenyl)fluorene concentration is as low as 0.1M.

What is claimed is:

1. An interfacial process for preparing polycarbonate comprising
   (a) feeding a stream of a carbonate precursor into a reactor at a first rate,
   (b) feeding a stream of a monomer mix of bisphenoxy fluorene in aqueous base into said reactor at a second rate, where said second rate is less than said first rate,
   (c) combining said stream of carbonate precursor with said stream of monomer mix in the presence of an organic solvent to form a reaction mixture in which the bisphenoxy fluorene is reacted with the carbonate precursor at a temperature of about 50° C. or more to produce a polycarbonate,
   (d) increasing said second rate, and
   (e) recovering a polycarbonate.

2. The process of claim 1 wherein the bisphenoxy fluorene is reacted with the carbonate precursor at a temperature in the range of about 60° C. to about 90° C.

3. The process of claim 1 wherein, in step (b), the second rate is about 60 percent or less of the first rate.

4. The process of claim 1 wherein, in step (b), the second rate is about 30 percent or less of the first rate.

5. The process of claim 1, wherein in step (d), the second rate is increased until it is equal to the first rate.

6. The process of claim 1 wherein the second rate is increased in two or more increments.

7. The process of claim 1 wherein the increments of increase in the second rate are equal.

8. The process of claim 1 further comprising a step of feeding a stream of base into said reactor at rate equal to or greater than the first rate.

9. The process of claim 8 wherein, when the second rate is increased, the rate of feed of the stream of base is simultaneously decreased.

10. The process of claim 9 wherein the second rate is increased by about 80 percent or less and the rate of feed of the stream of base is decreased by about 80 percent or less.

11. The process of claim 9 wherein the second rate is set equal to the first rate and the feed of the stream of base is stopped.

12. The process of claim 1 further comprising a step of heating the monomer mix of bisphenoxy fluorene in aqueous base to a temperature of about 50° C. or more before reaction of the bisphenoxy fluorene with the carbonate precursor.

13. An interfacial process for preparing a polycarbonate comprising (a) contacting a bisphenoxy fluorene with a carbonate precursor at a temperature of about 50° C. or more in a reaction mixture which consists essentially of aqueous base and an organic solvent, to produce a polycarbonate, and (b) recovering a polycarbonate.

14. The process of claim 13 wherein the bisphenoxy fluorene is contacted with the carbonate precursor at a temperature in the range of about 60° C. to about 90° C.

15. The process of claim 13 wherein the bisphenoxy fluorene is dissolved in the aqueous base.

16. The process of claim 13 wherein the reaction mixture is under a pressure in the range of greater than one atmosphere to about 10 atmospheres.

17. The process of claim 13 wherein the ratio of moles of base to moles of bisphenoxy fluorene in the reaction mixture is about 2.1 or more.

18. The process of claim 13 wherein the pH of the reaction mixture is in the range of about 12.0 to less than 14.0.

19. The process of claim 13 wherein the concentration of bisphenoxy fluorene in the aqueous phase of the reaction mixture is at least about 0.05M.

20. The process of claim 13 wherein step (a) further comprises heating said bisphenoxy fluorene to a temperature of about 50° C. or more before contacting it with said carbonate precursor.

21. The process of claim 13 wherein step (a) comprises forming a bischloroformate oligomer from said bisphenoxy fluorene and said carbonate precursor.

22. The process of claim 21 further comprising a step of contacting the bischloroformate oligomer with a polymer chain terminating agent.

23. The process of claim 13 wherein the concentration of bisphenoxy fluorene in the aqueous phase of the reaction mixture is at least about 0.1M.

24. The process of claim 13 wherein the reaction mixture further consists essentially of one or more of the dihydric phenols described as follows:

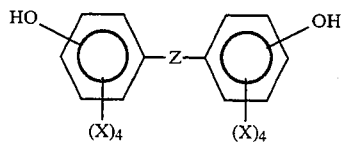

wherein:

(a) Z is (I) a divalent radical, of which all or different portions can be (A) linear, branched, cyclic or bicyclic, (B) aliphatic or aromatic, and (C) saturated or unsaturated, said divalent radical being composed of 1–35 carbon atoms together with up to five atoms selected from the group consisting of oxygen, nitrogen, sulfur, phosphorous and halogen atoms; or is (II) S, $S_2$, SO, $SO_2$, O or CO; or is (III) a single bond; and (b) each X is independently hydrogen, a halogen or a $C_1$–$C_{12}$ linear or cyclic alkyl, alkoxy, aryl or aryloxy radical.

25. The process of claim 24 wherein a bisphenoxy fluorene is at least about 40 percent of the combined weight of the bisphenoxy fluorene(s) and the dihydric phenol(s).

26. The process of claim 24 wherein said dihydric phenol is Bisphenol-A.

27. The process of claim 13 wherein the bisphenoxy fluorene is 9,9-bis(hydroxyphenyl)fluorene.

28. The process of claim 26 wherein the bisphenoxy fluorene is 9,9-bis(hydroxyphenyl)fluorene.

29. The process of claim 13 wherein the reaction mixture further consists essentially of one or more members of the group consisting of a dicarboxylic acid, a hydroxy carboxylic acid, and ester-forming derivatives of both.

30. An interfacial process for preparing a polycarbonate comprising (a) contacting a bisphenoxy fluorene with a carbonate precursor at a temperature of about 50° C. or more in a reaction mixture comprising aqueous base and an organic solvent in the absence of a phase transfer catalyst, to produce a polycarbonate, and (b) recovering a polycarbonate.

31. The process of claim 13 wherein the concentration of bisphenoxy fluorene in the aqueous phase of the reaction mixture is at least about 0.3M.

32. The process of claim 13 wherein the carbonate precursor is phosgene.

33. The process of claim 24 wherein the carbonate precursor is phosgene.

34. The process of claim 30 wherein the concentration of bisphenoxy fluorene in the aqueous phase of the reaction mixture is at least about 0.05M.

35. The process of claim 30 wherein the concentration of bisphenoxy fluorene in the aqueous phase of the reaction mixture is at least about 0.1M.

36. The process of claim 30 wherein the concentration of bisphenoxy fluorene in the aqueous phase of the reaction mixture is at least about 0.3M.

37. The process of claim 30 wherein the bisphenoxy fluorene is contacted with the carbonate precursor at a temperature in the range of about 60° C. to about 90° C.

38. The process of claim 30 wherein the reaction mixture further includes one or more of the dihydric phenols described as follows:

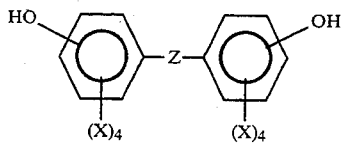

wherein:
(a) Z is (I) a divalent radical, of which all or different portions can be (A) linear, branched, cyclic or bicyclic, (B) aliphatic or aromatic, and (C) saturated or unsaturated, said divalent radical being composed of 1-35 carbon atoms together with up to five atoms selected from the group the group consisting of oxygen, nitrogen, sulfur, phosphorous and halogen atoms; or is (II) S, $S_2$, SO, $SO_2$, or CO; or is (III) a single bond; and
(b) each X is independently hydrogen, a halogen or a $C_1$-$C_{12}$ linear or cyclic alkyl, alkoxy, aryl or aryloxy radical.

39. The process of claim 38 wherein said dihydric phenol is Bisphenol-A.

40. The process of claim 30 wherein the carbonate precursor is phosgene.

41. The process of claim 38 wherein the carbonate precursor is phosgene.

42. The process of claim 21 further comprising a step of contacting the bischloroformate oligomer with a polycarbonate condensation coupling catalyst.

43. The process of claim 42 further comprising a step of contacting the bischloroformate oligomer with a polymer chain terminating agent.

44. The process of claim 42 wherein the polycarbonate condensation coupling catalyst is a 2- or 4-substituted pyridine.

45. The process of claim 13 wherein the concentration of bisphenoxy fluorene in the aqueous phase of the reaction mixture is at least about 0.45M.

46. The process of claim 14 wherein the concentration of bisphenoxy fluorene in the aqueous phase of the reaction mixture is at least about 0.45M.

47. The process of claim 24 wherein the concentration of bisphenoxy fluorene in the aqueous phase of the reaction mixture is at least about 0.45M.

48. The process of claim 30 wherein the concentration of bisphenoxy fluorene in the aqueous phase of the reaction mixture is at least about 0.45M.

49. The process of claim 37 wherein the concentration of bisphenoxy fluorene in the aqueous phase of the reaction mixture is at least about 0.45M.

50. The process of claim 38 wherein the concentration of bisphenoxy fluorene in the aqueous phase of the reaction mixture is at least about 0.45M.

* * * * *